United States Patent
Kimura et al.

(10) Patent No.: US 12,496,927 B2
(45) Date of Patent: Dec. 16, 2025

(54) POWER SUPPLY MANAGEMENT SYSTEM

(71) Applicant: HONDA MOTOR CO., LTD., Tokyo (JP)

(72) Inventors: Toru Kimura, Offenbach/Am Main (DE); Martin Kopp, Offenbach/Am Main (DE); Christian Koebel, Offenbach/Am Main (DE); Hisashi Nagaoka, Offenbach/Am Main (DE)

(73) Assignee: HONDA MOTOR CO., LTD., Tokyo (JP)

( * ) Notice: Subject to any disclaimer, the term of this patent is extended or adjusted under 35 U.S.C. 154(b) by 670 days.

(21) Appl. No.: 17/972,918

(22) Filed: Oct. 25, 2022

(65) Prior Publication Data
US 2023/0150389 A1    May 18, 2023

(30) Foreign Application Priority Data
Nov. 17, 2021   (JP) .................. 2021-186849

(51) Int. Cl.
*H02J 7/00* (2006.01)
*B60L 53/53* (2019.01)
(Continued)

(52) U.S. Cl.
CPC ............. *B60L 53/64* (2019.02); *B60L 53/53* (2019.02); *B60L 55/00* (2019.02); *H02J 7/0048* (2020.01);
(Continued)

(58) Field of Classification Search
CPC .......... B60L 53/53; B60L 53/64; B60L 55/00; H02J 7/007; H02J 7/007188; H02J 7/0048; H02J 7/00712
(Continued)

(56) References Cited

U.S. PATENT DOCUMENTS

| 7,657,438 B2 * | 2/2010 | Obayashi ................. B60L 3/12 |
| | | 903/903 |
| 11,728,732 B2 * | 8/2023 | Prasad ................. H02M 3/158 |
| | | 323/271 |

(Continued)

FOREIGN PATENT DOCUMENTS

| JP | 2014-138534 | 7/2014 |
| JP | 2021-16243 A | 2/2021 |

(Continued)

OTHER PUBLICATIONS

Japanese Office Action dated Jun. 27, 2023 issued in corresponding Japanese application No. 2021-186849; English translation included (13 pages).

*Primary Examiner* — Alexis B Pacheco
(74) *Attorney, Agent, or Firm* — Rankin, Hill & Clark LLP

(57) ABSTRACT

A power supply management system includes: a charge history information acquisition unit for acquiring charge history information on a charge history of a moving body storage battery; a transmission and distribution network power cost information acquisition unit for acquiring transmission and distribution network power cost information; a stored electric charge value evaluation unit for evaluating a value of an electric charge stored in the moving body storage battery, based on charge history information; and a power supply control unit for determining which of first supply power, discharged from the moving body storage battery, and second supply power, transmitted from a transmission and distribution network, is used by power supply processing, as electric power to be supplied to an electric load, based on a cost of the second supply power and a value of an electric charge, stored in the moving body storage battery.

5 Claims, 4 Drawing Sheets

(51) Int. Cl.
  *B60L 53/64*    (2019.01)
  *B60L 55/00*    (2019.01)
  *H02J 7/14*     (2006.01)
(52) U.S. Cl.
  CPC .... *H02J 7/00712* (2020.01); *H02J 7/007188* (2020.01)
(58) Field of Classification Search
  USPC ......................................................... 320/132
  See application file for complete search history.

(56) References Cited

U.S. PATENT DOCUMENTS

| | | | |
|---|---|---|---|
| 2012/0049792 A1* | 3/2012 | Crombez | H01M 10/44 320/109 |
| 2013/0079962 A1* | 3/2013 | Ishikawa | B60L 15/2045 701/22 |
| 2014/0350764 A1* | 11/2014 | Arai | B60L 50/16 180/65.265 |
| 2015/0061592 A1 | 3/2015 | Nakasone et al. | |
| 2016/0064970 A1* | 3/2016 | Shimizu | H02J 3/381 320/134 |
| 2020/0410519 A1 | 12/2020 | Tsuji et al. | |
| 2021/0326778 A1* | 10/2021 | Tokuoka | G06Q 30/0206 |
| 2022/0297546 A1* | 9/2022 | Bennett | B60L 53/65 |
| 2022/0306074 A1* | 9/2022 | Kono | B60W 30/18127 |

FOREIGN PATENT DOCUMENTS

| | | |
|---|---|---|
| WO | 2013/125217 A1 | 8/2013 |
| WO | 2019/181211 A1 | 9/2019 |
| WO | 2019/244213 A1 | 12/2019 |
| WO | 2021/064818 A1 | 4/2021 |

\* cited by examiner

FIG.4

| USER ID | VEHICLE ID | AMOUNT OF STORED ELECTRIC CHARGE | COST OF STORED ELECTRIC CHARGE | CARBON CREDIT AMOUNT IN STORED ELECTRIC CHARGE | PRIORITY FACTOR | NECESSITY FOR RECOVERY CHARGE |
|---|---|---|---|---|---|---|
| UID-1 | CID-1 | EA1 | EC1 | CD1 | COST | NECESSARY |
| UID-2 | CID-2 | EA2 | EC2 | CD2 | CARBON CREDIT | NECESSARY |
| UID-3 | CID-3 | EA3 | EC3 | CD3 | COST | UNNECESSARY |
| UID-4 | CID-4 | EA4 | EC4 | CD4 | COST | UNNECESSARY |
| UID-5 | CID-5 | EA5 | EC5 | CD5 | CARBON CREDIT | NECESSARY |
| .. | .. | .. | .. | .. | .. | .. |

22

POWER SUPPLY MANAGEMENT SYSTEM

INCORPORATION BY REFERENCE

The present application claims priority under 35 U.S.C. § 119 to Japanese Patent Application No. 2021-186849 filed on Nov. 17, 2021. The content of the application is incorporated herein by reference in its entirety.

BACKGROUND OF THE INVENTION

Field of the Invention

The present invention relates to a power supply management system.

Description of the Related Art

Conventionally, there has been proposed a system for determining which electric power is used for charging an electric vehicle by comparing: a price of the electric power charged in the storage battery; and a price of the electric power supplied from the commercial power system, when charging an electric vehicle (see, for example, Japanese Patent Laid-Open No. 2014-138534).

The above conventional system makes it possible to reduce electric power cost in charging the electric vehicle. However, since electric vehicles are expected to be more widespread, there is a demand for technique capable of utilizing the storage batteries provided in the electric vehicles as a power buffer.

The present invention has been made in view of this background, and an object of the present invention is to provide a power supply management system capable of utilizing an electric moving body whose power source is electric power such as an electric automobile, for a power buffer.

SUMMARY OF THE INVENTION

An aspect to achieve the above object includes a power supply management system including: a charge history information acquisition unit for acquiring charge history information on a charge history of a moving body storage battery provided in an electric moving body, the electric moving body being left in a predetermined area covered by a transmission and distribution network; a transmission and distribution network power cost information acquisition unit for acquiring transmission and distribution network power cost information on a cost of electric power supplied from the transmission and distribution network; a stored electric charge value evaluation unit for evaluating a value of an electric charge based on the charge history information, the electric charge being stored in the moving body storage battery; and a power supply control unit: for executing power supply processing for supplying electric power to an electric load located in the predetermined area; and for determining which of first supply power and second supply power is used by the power supply processing as electric power to be supplied to the electric load, based on a cost of the second supply power and a value of an electric charge stored in the moving body storage battery, the first supply power being discharged from the moving body storage battery, the second supply power being transmitted from the transmission and distribution network, the cost of the second supply power being recognized from the transmission and distribution network power cost information, the value of the electric charge stored in the moving body storage battery being evaluated by the stored electric charge value evaluation unit.

The above power supply management system may be configured such that: the charge history information includes information of a carbon credit or a cost of electric power used for charging the moving body storage battery; and the stored electric charge value evaluation unit determines a value of an electric charge stored in the moving body storage battery by setting a cost or a carbon credit of electric power, used for giving a charge of an electric charge stored in the moving body storage battery, to a target for value evaluation, and evaluates a value of the electric charge stored in the moving body storage battery.

The above power supply management system may be configured such that: the stored electric charge value evaluation unit evaluates a cost of electric power used for giving a charge of an electric charge stored in the moving body storage battery as a value of the electric charge stored in the moving body storage battery; and the power supply control unit compares a cost of the first supply power with a cost of the second supply power, and supplies electric power with a lower cost to the electric load, the cost of the first supply power being based on a cost of electric power used for giving a charge of an electric charge stored in the moving body storage battery, the cost of electric power used for giving the charge of the electric charge stored in the moving body storage battery being evaluated by the stored electric charge value evaluation unit.

The above power supply management system may further include a charge control unit for executing a recovery charge processing, to recover a remaining electric charge amount of the moving body storage battery, the recovery charge processing being processing for charging the moving body storage battery, the remaining electric charge amount of the moving body storage battery having been reduced by discharge of the first supply power when the power supply control unit executes the power supply processing using the first supply power.

The above power supply management system may be configured such that the power supply control unit: determines, for a plurality of the electric moving bodies including a first electric moving body, whether the power supply processing supplies the first supply power to an electric load by discharging electric power from a moving body storage battery; and sets a first moving body storage battery to the electric load when the recovery charge processing is executed by the charge control unit after the power supply processing supplies the first supply power to the electric load by discharging the first moving body storage battery, determines which of first supply power, to be discharged from a moving body storage battery other than the first electric moving body, and second supply power is used by the power supply processing, and executes the power supply processing, the first moving body storage battery being provided in the first electric moving body, the second supply power being transmitted from the transmission and distribution network.

The above power supply management system allows an electric moving body whose power source is electric power to be utilized as a power buffer.

BRIEF DESCRIPTION OF THE DRAWINGS

FIG. 4 is an explanatory diagram of information recorded in a user DB.

DETAILED DESCRIPTION OF THE PREFERRED EMBODIMENTS

1. Power Supply Management System Configuration

Figure 1:
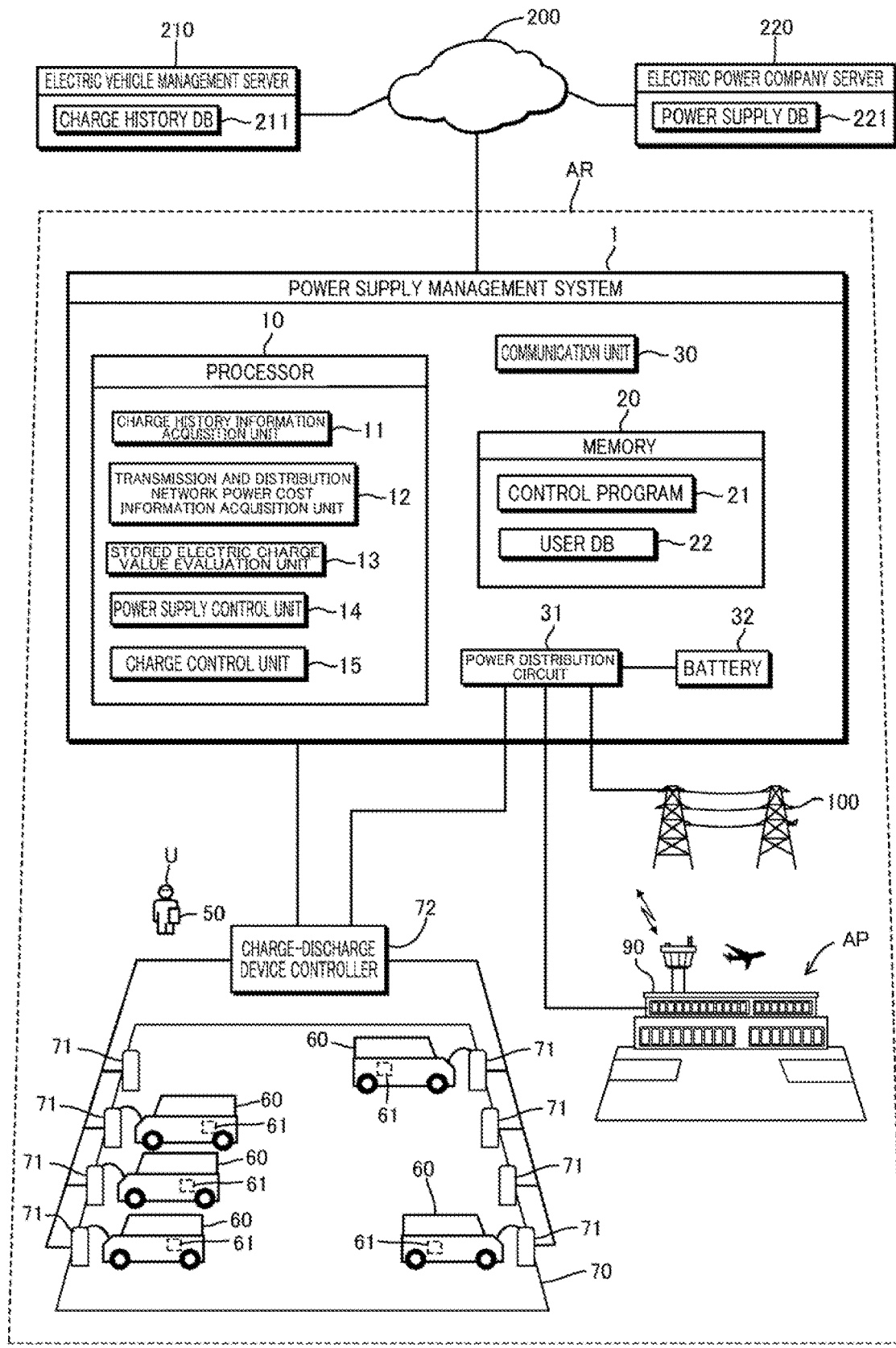
FIG. 1 is a configuration diagram of a power supply management system.

The following describes a configuration of a power supply management system 1 of the present embodiment with reference to FIG. 1. The power supply management system 1 performs a management processing on power supply for an electric load in an area AR, which is an electric power supply area of a transmission and distribution network 100. The power supply management system 1 uses a battery 61 (moving body storage battery) provided in an electric vehicle 60, parked in the area AR of the transmission and distribution network 100, as a power buffer.

Here, first supply power denotes electric power supplied from the battery 61 of the electric vehicle 60, and second supply power denotes electric power supplied from the transmission and distribution network 100. The power supply management system 1 determines which electric power of the first supply power and the second supply power is supplied to an electric load. The electric loads include, for example, electric equipment used in a management facility of an airport AP, and a battery 61 when it is charged.

FIG. 1 shows a situation in which a plurality of electric vehicles 60 are parked in a parking lot 70 provided close to the airport AP. A charge-discharge device 71 is set in each parking space of the parking lot 70. The electric vehicle 60 is an electric automobile, a plug-in hybrid automobile, or the like provided with a battery 61, which is a power source. Charge-discharge cables of the charge-discharge device 71 are connected to a charging port of the electric vehicle 60, and thereby the charge-discharge device 71 charges and discharges the battery 61. The electric vehicle 60 corresponds to an electric moving body of the present disclosure. The charge-discharge device 71 detects a remaining electric charge amount in the battery 61 of the connected electric vehicle 60, and executes charge-discharge processing of the battery 61.

The charge-discharge device 71 is connected to a charge-discharge device controller 72. The charge-discharge device controller 72 is a control unit configured with a processor, a memory, an interface circuit, and the like. The charge-discharge device controller 72 receives input of battery status information indicating the status of the battery 61 detected by the charge-discharge device 71. Further, the control signal output from the charge-discharge device controller 72 to the charge-discharge device 71 sets what processing is performed to charge and discharge the battery 61 by the charge-discharge device 71.

The power supply management system 1 is a computer system configured with a processor 10, a memory 20, a communication unit 30, a power distribution circuit 31, a battery 32, and the like. The power distribution circuit 31 is connected to the charge-discharge device controller 72, and transmits electric power to and from the charge-discharge device 71 via the charge-discharge device controller 72. Further, the power distribution circuit 31 is connected to the transmission and distribution network 100, and transmits electric power (buys and sells electric power) to and from the transmission and distribution network 100. Here, the electric power transmitted by the transmission and distribution network 100 includes electric power generated by renewable energy (solar energy, wind power, geothermal power, etc.).

The battery 32 is connected to the power distribution circuit 31, is charged with electric power output from the power distribution circuit 31 as needed, and also supplies electric power to the power distribution circuit 31. Further, the power distribution circuit 31 is connected to a management facility 90 in the airport AP, and supplies electric power from the transmission and distribution network 100 or the battery 61 to the electric equipment in the management facility 90.

The communication unit 30, via a communication network 200, communicates with: an electric vehicle management server 210; an electric power company server 220; a charge-discharge device controller 72; an electric vehicle 60; a mobile terminal 50 used by a user U of the electric vehicle 60; a management facility 90 in the airport AP; and the like. Although FIG. 1 illustrates one user U, the power supply management system 1 actually communicates with a plurality of mobile terminals 50 respectively used by a plurality of users U. The electric vehicle management server 210 and the electric power company server 220 are computer systems configured with processors, memories, communication units, and the like. The mobile terminals 50 include smartphones, tablet terminals, mobile phones.

The electric vehicle management server 210 includes a charge history DB (database) 211 in which the charge history of the battery 61 provided in the electric vehicle 60 is recorded. The charge history includes the charge date and time, the cost of the electric power used for charging, the carbon credit of the electric power used for charging, and the like. The electric vehicle management server 210, when the battery 61 of the electric vehicle 60 is charged, receives charging information of the battery 61 transmitted via the communication network 200 from the electric vehicle 60, the charge-discharge device 71, or the charge-discharge device controller 72, and thereby recognizes the charge status of the battery 61. Then, the electric vehicle management server 210 records the recognized charge status of the battery 61 in the charge history DB 211. The electric power company server 220 includes a power supply DB 221 in which there is recorded information such as the cost (power charge) of the power to be supplied (commercial power) and the excess or deficiency of power (supply and demand situation) in the area AR.

The memory 20 of the power supply management system 1 stores: a control program 21 of the power supply management system 1; and a user DB 22 in which there is recorded information on the battery 61 of the electric vehicle 60 used by the user U who has been registered for use of the power supply management using the power supply management system 1. As shown in FIG. 4, the user DB 22 contains the following records of each user U: an ID of the user U; a vehicle ID of the electric vehicle 60 used by the user U; an amount of electric charge stored in the battery 61 of the electric vehicle 60; a cost of the electric charge stored in the battery 61 (cost required for charging); a carbon credit amount of electric charge stored in the battery 61 (carbon credit amount of electric power used for charging); a priority specified by the user U (giving priority to cost or giving priority to carbon credit); and necessity of recovery charge of the battery 61 specified by the user U.

The amount, cost, and carbon credit amount of the electric charge stored in the battery 61 are recorded by the stored electric charge value evaluation unit 13, as is to be described below. The priority and the necessity of recovery charge are set by a user U accessing the power supply management system 1 with the mobile terminal 50 or the like.

The processor 10 reads and executes the control program 21 stored in the memory 20, and thereby functions as a charge history information acquisition unit 11, a transmission and distribution network power cost information acquisition unit 12, a stored electric charge value evaluation unit 13, a power supply control unit 14, and a charge control unit. The charge history information acquisition unit 11 accesses the electric vehicle management server 210 to refer to the charge history DB, and thereby acquires the charge history information of the electric vehicle 60 parked in the parking lot 70.

The transmission and distribution network power cost information acquisition unit 12 accesses the electric power company server 220 to refer to the power supply DB 221, and thereby acquires the transmission and distribution network power cost information. The stored electric charge value evaluation unit 13 evaluates the value of the electric charge stored in the battery 61 based on the charge history information of the battery 61 of the electric vehicle 60 acquired by the charge history information acquisition unit 11. The stored electric charge value evaluation unit 13 evaluates the value of the electric charge stored in the battery 61 using the cost and carbon credit as evaluation factors, and records the evaluation result (electric charge cost, carbon credit of electric power used for charging) in the user DB 22.

The power supply control unit 14 executes a power supply processing of supplying the first supply power from the battery 61 of the electric vehicle 60 or the second supply power from the transmission and distribution network 100 to the electric load in the area AR. The charge control unit 15 executes a recovery charge processing of recovering the remaining electric charge amount of the battery 61 whose remaining electric charge amount has been reduced by being used for the power supply processing. The charge control unit 15, by the recovery charge processing, charges the battery 61 basically up to the remaining electric charge amount immediately before being used for the power supply processing. However, the charge control unit 15 may fully charge the battery 61 according to a specification of a user U, or may set a degree of recovery of the remaining charge amount of the battery 61 according to a specification of a user U.

2. Power Supply Management Processing

Figure 2:
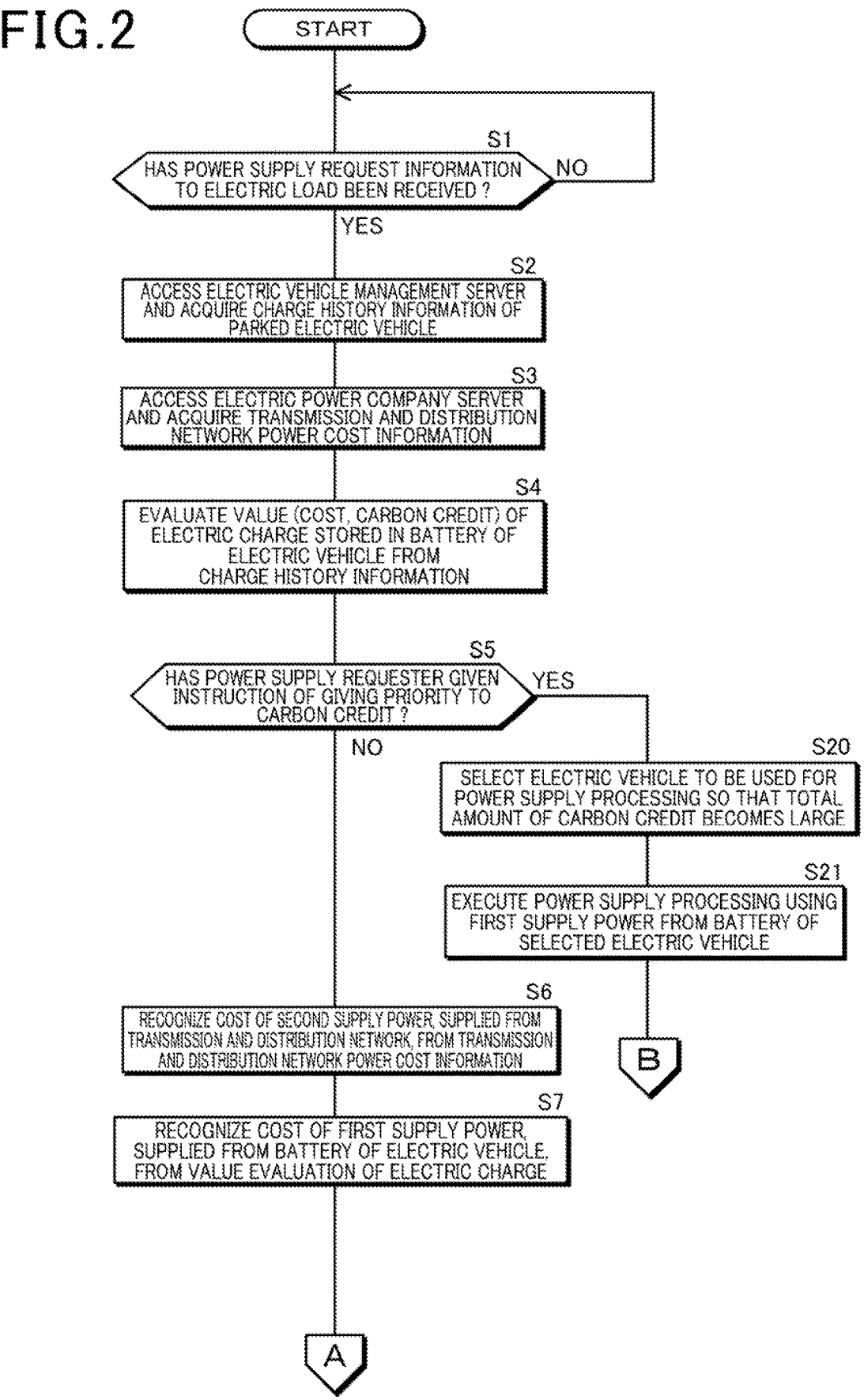
FIG. 2 is a first flowchart of power supply management processing using a parked electric vehicle as a power buffer.
Figure 3:
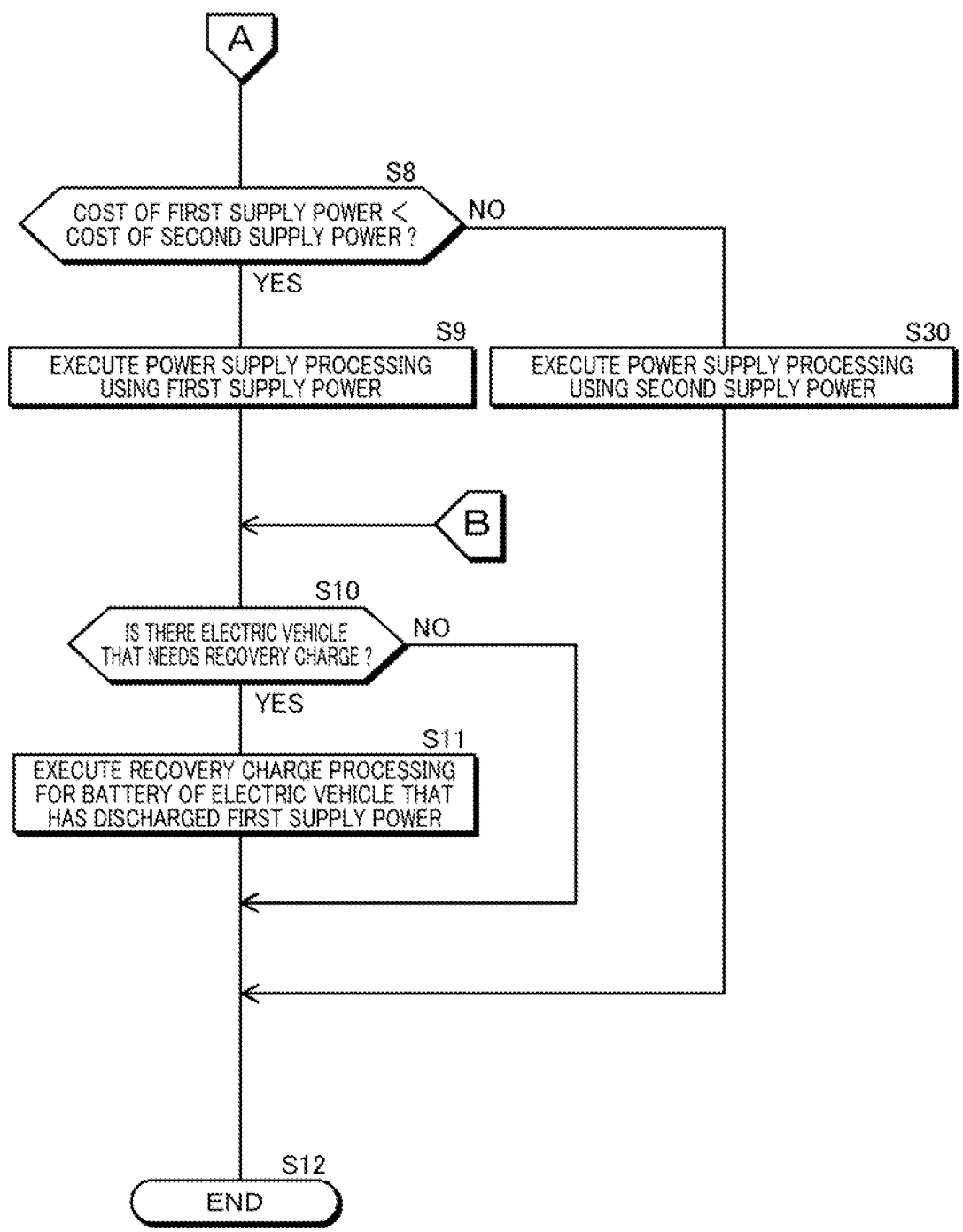
FIG. 3 is a second flowchart of power supply management processing using a parked electric vehicle as a power buffer.

There is to be described a power supply management processing for the electric load, which is executed by the power supply management system 1 according to the flowcharts shown in FIGS. 2 to 3. The following describes a case in which the electric equipment used in the management facility 90 in the airport AP is an electric load and power supply is performed to the management facility 90.

In step S1 of FIG. 2, when receiving the power supply request information for requesting power supply from the management facility 90, the power supply control unit 14 advances processing to step S2. In step S2, the charge history information acquisition unit 11 accesses the electric vehicle management server 210, refers to the charge history DB 211, and thereby acquires the charge history information of the battery 61 of the electric vehicle 60 parked in the parking lot 70.

In the next step S3, the transmission and distribution network power cost information acquisition unit 12 accesses the electric power company server 220 to refer to the power supply DB 221, and thereby acquires the transmission and distribution network power cost information. In the following step S4, the stored electric charge value evaluation unit 13 evaluates the value (cost and carbon credit) of the electric charge stored in the battery 61 based on the charge history information. In this case, when there are the plurality of parked electric vehicles 60, the evaluation of the value of the electric charge may be performed on the total electric charge amount of the batteries 61 of a plurality of electric vehicles 60, or may be performed on the average of evaluations for electric charges of the individual batteries 61.

In the next step S5, the power supply control unit 14 determines whether the power supply requester (here, the requester for power supply to the management facility) has given an instruction of giving priority to carbon credit. Then, the power supply control unit 14 advances processing to step S20 if there is the instruction of giving priority to carbon credit, and advances processing to step S6 if there is no instruction of giving priority to carbon credit (if there is an instruction of giving priority to cost).

Note that an upper limit of the cost may be set in the instruction of giving priority to carbon credit. In other words, for example, the instruction may be such that: if the cost of the first supply power from the battery 61 is up to the cost of the second supply power from the transmission and distribution network 100+α, the carbon credit is prioritized and the power supply processing is executed using the first supply power; and if the cost of the first supply power exceeds the cost of the second supply power+α, the power supply processing is executed using the second supply power.

In step S6, the power supply control unit 14 recognizes the cost of the second supply power supplied from the transmission and distribution network 100, from the transmission and distribution network power cost information. In the following step S7, the power supply control unit 14 recognizes the cost of the first supply power supplied from the battery 61, from the value evaluation of the electric charge of the battery 61 made by the stored electric charge value evaluation unit 13. In the following step S8, the power supply control unit 14 determines whether the cost of the first supply power is lower than the cost of the second supply power.

Then, if the cost of the first supply power is lower than the cost of the second supply power, the power supply control unit 14 advances processing to step S9. In step 9, the power supply control unit 14 uses the first supply power from the battery 61 of the electric vehicle 60 to execute a power supply processing of supplying electric power to the management facility 90, and advances processing to step S10. On the other hand, if the cost of the first supply power is the same as the cost of the second supply power, or the cost of the first supply power is higher than the cost of the second supply power, the power supply control unit 14 advances processing to step S30. In step S30, the power supply control unit 14 uses the second supply power from the transmission and distribution network 100 to execute a power supply processing of supplying electric power to the management facility 90, and advances processing to step S12.

In step S10, the charge control unit 15 refers to the user DB 22 and determines whether there is an electric vehicle 60 with specification of need for recovery charge among the electric vehicles 60 having been discharged from the battery 61 in the power supply processing. Then, if there is an electric vehicle 60 with specification of need for recovery charge, the charge control unit 15 advances processing to step S11 to execute recovery charge processing for the electric vehicle 60 with specification of need for recovery charge.

The recovery charge processing is configured such that: the battery 61 (corresponding to the first mobile storage battery of the present disclosure) of the electric vehicle 60 (corresponding to the first electric moving body of the present disclosure), which is the target of the recovery charge processing, is determined to be the electric load; and the processing of steps S2 to S12, S20, S21, and S30 described above is performed on the other electric vehicles 60 and the transmission and distribution network 100, determining whether to use the first supply power or the second supply power for the recovery charge processing. On the other hand, if there is no electric vehicle 60 with specification of need for recovery charge among the electric vehicles 60 discharged from the battery 61 in the power supply processing, the charge control unit 15 advances processing to step S12.

In step S20 of FIG. 2, the power supply control unit 14 refers to the user DB 22. Then, the power supply control unit 14 selects an electric vehicle 60, from the electric vehicles 60 parked in the parking lot 70, to be used for the power supply processing so that the total amount of carbon credit becomes large in the electric charge of the battery 61 to be used for power supply processing. In the following step S21, the power supply control unit 14 uses the first supply power from the batteries 61 of the selected electric vehicles 60 to execute power supply processing for supplying electric power to the management facility, and advances processing to step S10 in FIG. 3.

3. Other Embodiments

The above embodiment illustrates the electric moving body of the present disclosure with the electric vehicle 60, but the electric moving body of the present disclosure may be any moving body whose power source is a storage battery, and may be an electric moving body other than a vehicle such as a flying body or a ship. In the case of an electric flying body, the electric flying body parked at a tarmac is used for an electric power buffer, and in the case of an electric ship, the electric ship moored in a mooring area is used for an electric power buffer.

In the above embodiment, the stored electric charge value evaluation unit 13 targets the cost and the carbon credit for the value evaluation of the electric charge stored in the battery 61. However, the target of the value evaluation may be only any one of the cost and the carbon credit. Further, the target of the value evaluation of the electric charge may be other than the cost and the carbon credit.

In the above embodiment, the charge control unit 15 is provided to execute recovery charge processing for recovering the remaining electric charge amount of the battery 61 of the electric vehicle 60, which has been used for the power supply processing. However, the configuration may be such that no recovery charge processing is executed.

Note that FIG. 1 is a schematic diagram showing the configuration of the power supply management system 1 divided based on main things to be processed to facilitate the understanding of the invention of the present application, and the power supply management system 1 may be configured with another division. Further, the processing of each component may be executed by one hardware unit, or may be executed by a plurality of hardware units. Further, the processing by each component according to the flowcharts shown in FIGS. 2 to 3 may be executed by one program, or may be executed by a plurality of programs.

4. Configuration Supported by the Above Embodiments

The above embodiments are specific examples of the following configurations.
(Configuration 1)

A power supply management system, including: a charge history information acquisition unit for acquiring charge history information on a charge history of a moving body storage battery provided in an electric moving body, the electric moving body being left in a predetermined area covered by a transmission and distribution network; a transmission and distribution network power cost information acquisition unit for acquiring transmission and distribution network power cost information on a cost of electric power supplied from the transmission and distribution network; a stored electric charge value evaluation unit for evaluating a value of an electric charge based on the charge history information, the electric charge being stored in the moving body storage battery; and a power supply control unit: for executing power supply processing for supplying electric power to an electric load located in the predetermined area; and for determining which of first supply power and second supply power is used by the power supply processing as electric power to be supplied to the electric load, based on a cost of the second supply power and a value of an electric charge stored in the moving body storage battery, the first supply power being discharged from the moving body storage battery, the second supply power being transmitted from the transmission and distribution network, the cost of the second supply power being recognized from the transmission and distribution network power cost information, the value of the electric charge stored in the moving body storage battery being evaluated by the stored electric charge value evaluation unit.

The power supply management system of the configuration 1 makes it possible to utilize the electric moving body as a power buffer and determine supplying electric power from the moving body battery to the electric load based on the value of the electric charge stored in the moving body storage battery.
(Configuration 2)

The power supply management system according to configuration 1, wherein: the charge history information includes information of a carbon credit or a cost of electric power used for charging the moving body storage battery; and the stored electric charge value evaluation unit determines a value of an electric charge stored in the moving body storage battery by setting a cost or a carbon credit of electric power, used for giving a charge of an electric charge stored in the moving body storage battery, to a target for value evaluation, and evaluates a value of the electric charge stored in the moving body storage battery.

The power supply management system of the configuration 2 makes it possible: to target the cost or the carbon credit for value evaluation of the electric power used for giving a charge of the electric charge stored in the moving body battery, to evaluate the value of the electric charge stored in the moving body storage battery; and to determine whether the first supply power from the moving body storage battery or the second supply power from the transmission and distribution network is supplied to the electric load, depending on the cost consciousness or environmental consciousness of the user of the electric load.

(Configuration 3)

The power supply management system according to configuration 2, wherein: the stored electric charge value evaluation unit evaluates a cost of electric power used for giving a charge of an electric charge stored in the moving body storage battery as a value of the electric charge stored in the moving body storage battery; and the power supply control unit compares a cost of the first supply power with a cost of the second supply power, and supplies electric power with a lower cost to the electric load, the cost of the first supply power being based on a cost of electric power used for giving a charge of an electric charge stored in the moving body storage battery, the cost of electric power used for giving the charge of the electric charge stored in the moving body storage battery being evaluated by the stored electric charge value evaluation unit.

The power supply management system of configuration 3 makes it possible to supply electric power with the lower cost, of the first supply power from the moving body storage battery and the second supply power from the transmission and distribution network, to the electric load; and to reduce the cost of using the electric load.

(Configuration 4)

The power supply management system according to any one of configurations 1 to 3, further including a charge control unit for executing a recovery charge processing, to recover a remaining electric charge amount of the moving body storage battery, the recovery charge processing being processing for charging the moving body storage battery, the remaining electric charge amount of the moving body storage battery having been reduced by discharge of the first supply power when the power supply control unit executes the power supply processing using the first supply power.

The power supply management system of configuration 4 makes it possible that, when the moving body storage battery has a remaining electric charge amount reduced when being utilized as a power buffer, the recovery charge processing recovers the remaining electric charge amount of the moving body storage battery. This can prevent a movement using the electric moving body from being hindered due to insufficient remaining electric charge amount in the moving body storage battery.

(Configuration 5)

The power supply management system according to configuration 4, wherein the power supply control unit: determines, for a plurality of the electric moving bodies including a first electric moving body, whether the power supply processing supplies the first supply power to an electric load by discharging electric power from a moving body storage battery; and sets a first moving body storage battery to an electric load when the recovery charge processing is executed by the charge control unit after the power supply processing supplies the first supply power to the electric load by discharging the first moving body storage battery, determines which of first supply power, to be discharged from a moving body storage battery other than the first electric moving body, and second supply power is used by the power supply processing, and executes the power supply processing, the first moving body storage battery being provided in the first electric moving body, the second supply power being transmitted from the transmission and distribution network.

The power supply management system of configuration 5 makes it possible to reduce the electric power cost when the recovery charge processing charges the moving body storage battery.

REFERENCE SIGNS LIST

1 . . . power supply management system, 10 . . . processor, 11 . . . charge history information acquisition unit, 12 . . . transmission and distribution network power cost information acquisition unit, 13 . . . stored electric charge value evaluation unit, 14 . . . power supply control unit, 15 . . . charge control unit, 20 . . . memory, 21 . . . control program, 22 . . . user DB, 30 . . . communication unit, 31 . . . power distribution circuit, 32 . . . battery, 50 . . . mobile terminal, 60 . . . electric vehicle (electric moving body), 61 . . . battery (moving body storage battery), 70 . . . parking lot, 71 . . . charge-discharge device, 72 . . . charge-discharge device controller, 100 . . . transmission and distribution network, 200 . . . communication network, 210 . . . electric vehicle management server, 211 . . . charge history DB, 220 . . . electric power company server, 221 . . . power supply DB, U . . . user, AP . . . airport, AR . . . area covered by transmission and distribution network.

What is claimed is:

1. A power supply management system, comprising:
a charge history information acquisition unit for acquiring charge history information on a charge history of a moving body storage battery provided in an electric moving body, the electric moving body being left in a predetermined area covered by a transmission and distribution network;
a transmission and distribution network power cost information acquisition unit for acquiring transmission and distribution network power cost information on a cost of electric power supplied from the transmission and distribution network;
a stored electric charge value evaluation unit for evaluating a value of an electric charge based on the charge history information, the electric charge being stored in the moving body storage battery; and
a power supply control unit: for executing power supply processing for supplying electric power to an electric load located in the predetermined area; and for determining which of first supply power and second supply power is used by the power supply processing as electric power to be supplied to the electric load, based on a cost of the second supply power and a value of an electric charge stored in the moving body storage battery, the first supply power being discharged from the moving body storage battery, the second supply power being transmitted from the transmission and distribution network, the cost of the second supply power being recognized from the transmission and distribution network power cost information, the value of the electric charge stored in the moving body storage battery being evaluated by the stored electric charge value evaluation unit.

2. The power supply management system according to claim 1, wherein:
the charge history information includes information of a carbon credit or a cost of electric power used for charging the moving body storage battery; and
the stored electric charge value evaluation unit determines a value of an electric charge stored in the moving body storage battery by setting a cost or a carbon credit of electric power, used for giving a charge of an electric charge stored in the moving body storage battery, to a target for value evaluation, and evaluates a value of the electric charge stored in the moving body storage battery.

3. The power supply management system according to claim 2, wherein the stored electric charge value evaluation unit evaluates a cost of electric power used for giving a charge of an electric charge stored in the moving body storage battery as a value of the electric charge stored in the moving body storage battery, and the power supply control unit compares a cost of the first supply power with a cost of the second supply power, and supplies electric power with a lower cost to the electric load, the cost of the first supply power being based on a cost of electric power used for giving a charge of an electric charge stored in the moving body storage battery, the cost of electric power used for giving the charge of the electric charge stored in the moving body storage battery being evaluated by the stored electric charge value evaluation unit.

4. The power supply management system according to claim 1, further comprising a charge control unit for executing a recovery charge processing, to recover a remaining electric charge amount of the moving body storage battery, the recovery charge processing being processing for charging the moving body storage battery, the remaining electric charge amount of the moving body storage battery having been reduced by discharge of the first supply power when the power supply control unit executes the power supply processing using the first supply power.

5. The power supply management system according to claim 4, wherein the power supply control unit:

determines, for a plurality of the electric moving bodies including a first electric moving body, whether the power supply processing supplies the first supply power to an electric load by discharging electric power from a moving body storage battery; and sets a first moving body storage battery to an electric load when the recovery charge processing is executed by the charge control unit after the power supply processing supplies the first supply power to the electric load by discharging the first moving body storage battery, determines which of first supply power, to be discharged from a moving body storage battery other than the first electric moving body, and second supply power is used by the power supply processing, and executes the power supply processing, the first moving body storage battery being provided in the first electric moving body, the second supply power being transmitted from the transmission and distribution network.

\* \* \* \* \*